Nov. 12, 1968  E. HENRY-BIABAUD  3,410,609
BRAKING-SYSTEM SAFETY HYDRAULIC VALVES OF ARTICULATED VEHICLES
Filed April 28, 1967  2 Sheets-Sheet 1

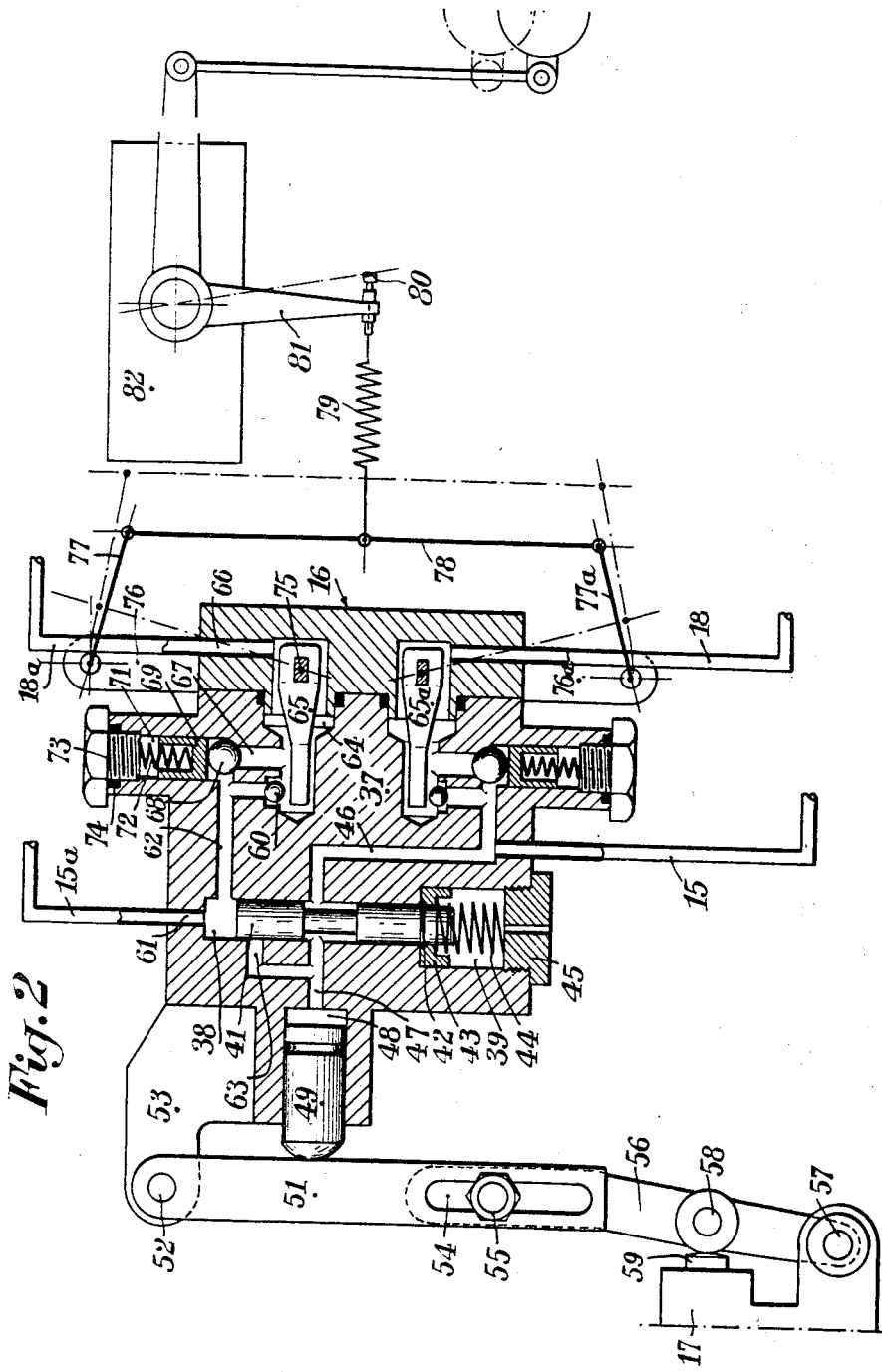

United States Patent Office 3,410,609
Patented Nov. 12, 1968

3,410,609
BRAKING-SYSTEM SAFETY HYDRAULIC VALVES
OF ARTICULATED VEHICLES
Edmond Henry-Biabaud, Paris, France, assignor to
Societe Anonyme Andre Citroen, Paris, France,
a body corporate of France
Filed Apr. 28, 1967, Ser. No. 634,515
Claims priority, application France, May 4, 1966,
60,216
5 Claims. (Cl. 303—7)

ABSTRACT OF THE DISCLOSURE

Safety hydraulic valve for the braking system of an articulated vehicle, this system comprising on the one hand a hydraulic braking circuit for the tractor and on the other hand a braking circuit for the semitrailer, which is of the pneumatic or vacuum type and adapted to be put into service by means of a pneumatic valve, characterised in that it comprises a chamber in which a piston adapted to actuate said pneumatic valve controlling the semitrailer braking circuit is slidably fitted, a slide-valve distributor connected to said chamber and to the two supply pipe lines so as to put said chamber under pressure when at least one of said two pipe lines is under pressure, and thus cause the instantaneous operation of said valve while separating the independent hydraulic braking circuits of the front and rear brakes, and a throttling device adjustable as a function of the load carried by the rear axle of the tractor.

Background of the invention

The present invention relates to braking systems of vehicles and has specific reference to a hydraulic safety valve for the braking system of an articulated vehicle.

Braking systems of articulated vehicles are already known, that is, for vehicles comprising a tractor and a semitrailer, wherein the tractor braking system proper comprises a hydraulic circuit, the semitrailer braking system being controlled by a separate circuit of the pneumatic or vacuum type.

In braking systems of this character it is necessary, when the semitrailer is coupled to the tractor, that the action exerted on the brake pedal produces firstly the braking of the semitrailer and then, after a certain time-lag, the braking of the tractor.

Summary of the invention

It is the specific object of the present invention to provide a combination of means which is particularly simple and efficient, and adapted to produce this predominance of the semitrailer braking action on the tractor braking action.

To this end, the hydraulic safety valve according to this invention for a braking system of articulated vehicle, which system comprises on the one hand a tractor hydraulic braking circuit incorporating a source of liquid under pressure feeding through the medium of the brake distributor two pipe lines leading to the front-wheel and rear-wheel brakes, wherein the fluid pressures are controlled and apportioned by the brake distributor as a function of the load carried by the rear axle of the tractor, and on the other hand a semitrailer braking circuit, of the pneumatic or vacuum type, adapted to be put into service by means of a pneumatic stop-valve, is characterised in that it comprises a chamber having slidably mounted therein a piston adapted to actuate the pneumatic valve of the semitrailer braking system, a slide-valve distributor connected to said chamber and to said pair of pipe lines in order to pressurize said chamber when at least one of said two pipe lines is under pressure and thus cause the almost instantaneous operation of said valve while maintaining said front-wheel and rear-wheel hydraulic brake circuits separated from each other, and throttling means adjustable as a function of the load carried by the rear axle of the tractor and connected between on the one hand said pair of feed pipe lines and on the other hand a pair of outlet pipe lines leading respectively to the front brake cylinders and to the rear brake cylinders, in order to retard the transmission of pressure fluid to said tractor brake cylinders when the rear axle of the tractor is under load.

The hydraulic valve is absolutely reliable for in case of failure of one of the brake-cylinder supply pipe lines the pressure in the other supply pipe line is always effective, during a brake application, for firstly actuating the semitrailer braking circuit stop-valve and therefore causing the predominance of the braking action of said semitrailer.

Brief description of the drawing

A typical form of embodiment of the present invention will now be described by way of example with reference to the accompanying drawing, in which:

FIGURE 2 is a sectional view showing on a larger scale the hydraulic valve controlling the semitrailer braking circuit.

Description of the preferred embodiment

Figure 1:
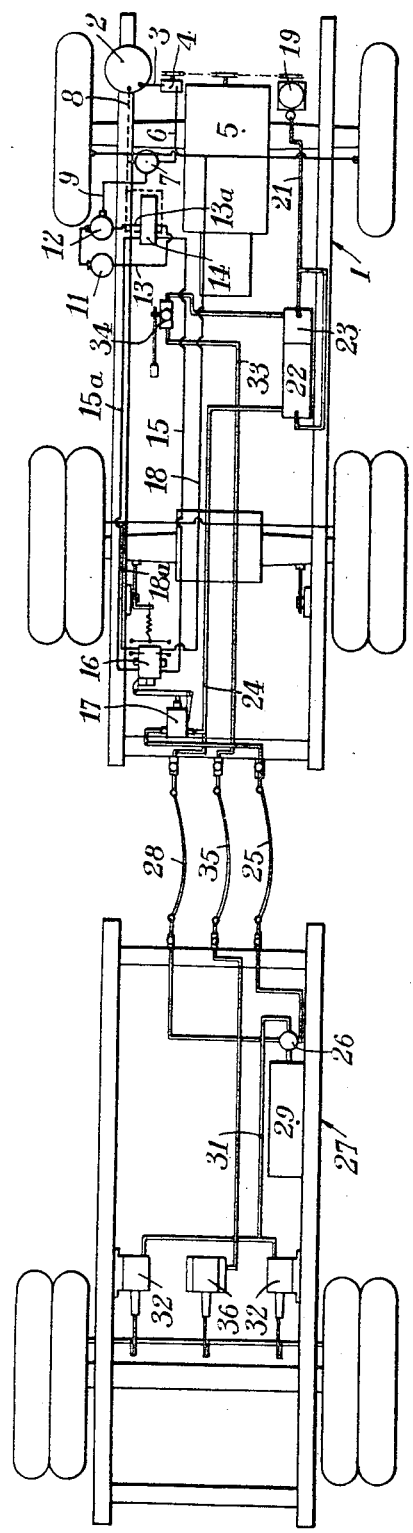
FIGURE 1 is a diagram illustrating the complete braking system of an articulated vehicle.

Reference will firstly be made to the complete braking system of articulated vehicle which is illustrated in FIGURE 1.

The braking circuit of tractor 1 is of the hydraulic type and comprises a fluid reservoir 2 feeding through pipe lines 3 a pump 4 rotatably driven from the engine or power plant 5 of the tractor. This pump 4 is adapted to feed through a pipe line 6 a main accumulator or make-and-break device 7 connected through a return line 8 to the fluid reservoir 2. The make-and-break device 7 is connected through another pipe line 9 to a pair of accumulators 11 and 12 for controlling respectively the brakes of the front axle and those of the rear axle. These accumulators 11 and 12 are connected through separate pipe lines 13 and 13a to a brake distributor 14 actuated by the brake pedal. This brake distributor is of the type defined in the prior Edmond Henry-Biabaud Patent No. 2,926,660 and comprises essentially two distributor units between which the effort exerted on the brake pedal is apportioned by means of a compensator bar. This apportioning of the effort exerted on the brake pedal is effected as a function of the load carried by the rear axle of the tractor, which is detected by a suitable mechanical transmission system.

The brake distributor 14 is connected by means of a pair of pipe lines 15 and 15a to a hydraulic valve 16 controlling also a pneumatic valve 17 incorporated in the braking circuit of the semitrailer. The hydraulic valve 16 is connected through a pair of output lines 18 and 18a respectively to the front brake cylinders and to the rear brake cylinders of the tractor.

The braking circuit of the semitrailer may be either of the compressed-air type as illustrated in the drawing, or of the vacuum type. The compressed-air braking circuit illustrated by way of example in the drawing comprises a compressor 19 driven from the power unit 5 and supplying compressed air through a pipe line 21 to a pair of reservoirs, namely a main reservoir 22 and an auxiliary reservoir 23. The main reservoir 22 is connected through a pipe line 24 to the pneumatic valve 17 and through a flexible hose 25 to an emergency valve 26 mounted on the semitrailer 27. This valve 26 is responsive to the pressure prevailing in the pipe line 24 connected to the control input of this valve through another flexible hose 28. The emergency valve 26 is connected to the outlet of a compressed air reservoir 29 carried by the semitrailer 27 and is normally open, when the flexible hose 28 is coupled to the tractor circuit, whereby the pressure of the compressed air from the main reservoir 22 can be transmitted through a pipe line 31 to the brake cylinders 32 of the semitrailer. On the other hand, the auxiliary reservoir 23 is connected to a pipe line 33 having interposed therein a valve 34 actuatable by the hand brake of the tractor. This pipe line 33 is connected through a third flexible hose 35 to an emergency brake cylinder 36 of the semitrailer 27.

After having studied the generalities of the braking circuits of the articulated vehicle, the hydraulic valve 16 will now be described in detail with reference to FIGURE 2.

This valve 16 comprises a body 37 in which a bore 38 is formed which opens into a chamber 39 of greater cross-sectional area. Fitted in the bore 38 is a slide valve 41 having one end projecting into said chamber 39. A flanged washer 43 is secured by means of a circlip 42 to the aforesaid projecting end of slide valve 41, a coil compression spring 44 urging said flanged washer 43 against the bottom of chamber 39, said spring 44 reacting against a screw plug 45 closing this chamber. Thus, the slide valve 41 is normally urged by the same spring 44 to its inoperative position shown in FIGURE 2.

The pipe line 15 supplying brake fluid to the front brake cylinders is connected to a duct 46 formed in said body 37 of valve 16, which opens into the bore 38 in front of a groove formed in said slide valve 41 and in the same transverse plane as another duct 47, whereby both ducts 46 and 47 communicate with each other in the inoperative position of slide valve 41. The duct 47 is connected to a cylindrical chamber 48 in which a piston 49 is slidably mounted. The outer end of this piston 49 engages a lever 51 having one end pivotally mounted by means of a pin 52 on a plate 53 solid with the body 37 of valve 16. This lever 51 has an elongated aperture 54 formed therein which is engaged by a connecting pin or bolt 55 carried by another lever 56 fulcrured at 57 on the body of the valve 17 of the semitrailer braking circuit. This lever 56 carries a roller 58 engaging the projecting end of a valve, control member or slide 59 mounted in said valve 17.

The pipe line 15a feeding the rear brake cylinders of the tractor is connected through a duct 61 to the bottom of said bore 38, another duct 62 emerging into this bore in close proximity of this duct 61. A further duct 63 communicating with duct 47 opens into the bore 38 slightly below the front or top face of slide valve 41, as shown in the figure, and its communication with duct 61 (which as clearly shown is prevented in the inoperative position of the slide valve) can be restored or established during the initial portion of the downward stroke of slide valve 41.

The supply lines 15 and 15a communicate respectively with pipe lines 18 and 18a connected to the front and rear brake cylinders of the tractor through the medium of identical hydraulic circuits in the valve body 37. Therefore, only one of these circuits will be described herein, namely the one interconnecting the pipe lines 15 and 15a. The duct 62 communicating with pipe line 15a is connected through the medium of a ball-type throttling device 60 to a cavity 64 in which a lever 65 is pivotally mounted, this cavity communicating through another duct 66 with the pipe line 18a. This lever 65 is adapted to engage with its free end the ball 60 of the throttling device and therefore to control the fluid output between pipe lines 15a and 18a.

On the other hand, another duct 67 is branched off the ball-throttling device 60. The flow of fluid through this duct 67 is controlled by another ball valve 68 resiliently urged by a trigger 69 slidably mounted in a chamber 71. This trigger 69 is urged against the ball 68 by a coil compression spring 72 reacting against a screw plug 73 screwed in the body 37, a gasket 74 being interposed therebetween. The ball 68 urged by spring 72 constitutes a valve permitting the return flow of hydraulic fluid when the tractor brakes are released.

The pivoting lever 65 is rigid with a pin 75 having secured thereto, externally of the body 37, an arm 76. This arm 76 and the opposite corresponding arm 76a actuating the pivoting lever 65a controlling the communication between the pipe lines 15 and 18, are connected through corresponding links 77 and 77a to a compensator bar 78 connected in turn, intermediate its ends, by a traction spring 79, to an arm 81 of the shock-absorber mechanism 82 of the rear axle of the tractor. The tension of spring 79 is adjustable by means of a screw 80. The various component elements 76, 77, 78, 79 and 81 are shown in thick lines, in the figure, in the position obtaining when the rear axle of the tractor is unloaded, that is, when the semitrailer is not coupled, and in chain-dotted lines in the position obtaining when the rear axle is loaded, that is, when the semitrailer is coupled.

Now the operation of the braking circuit according to this invention will be described.

It will be assumed that the semitrailer 27 is coupled to the tractor 1. When the driver depresses the brake pedal, adequate pressures automatically adjusted and apportioned by the brake distributor 14 are transmitted to the feed lines 15 and 15a. The slide valve 41 in bore 38 is thus readily actuated by the fluid pressure produced in the pipe line 15a leading to the rear brake cylinders, this slide valve 41 being thus lowered, as seen in the drawing, against the resistance of its return coil spring 44. Under these conditions, pipe line 15a can communicate with chamber 48 through duct 61, bore 38 and ducts 63 and 47. As a consequence, piston 49 is subjected to the pressure prevailing in pipe line 15a and causes the lever 51 to pivot clockwise about pivot pin 52, whereby the companion lever 56 will rotate in the counter-clockwise direction about the pivot pin 57, so as to push inwards the control member 59 of valve 17. This valve is thus open to supply compressed air from the main reservoir 22 through said valve 17 and valve 26 to the brake cylinders 32 of the semitrailer.

The pressure prevailing in pipe line 15a is also transmitted with a certain time-lag to the pipe line 18a connected to the rear brake cylinders of the tractor. This time-lag is produced by the ball-valve throttling device 60 engaged by the free end of pivoting lever 65. In fact, as the semitrailer is coupled to the tractor the arm 76 is in the position shown in chain-dotted lines in FIGURE 2, whereby a certain effort is exerted on the ball 60, this effort being adjustable by means of the screw 80 regulating the tension of spring 79. Under these conditions, the hydraulic fluid flowing from pipe line 15a is retarded by the ball 60 during its flow from duct 62 to cavity 64. Therefore, the pressure prevailing in the supply line 15a is obtained after a certain delay in the pipe line 18a leading to the rear brake cylinders. The same applies of course to the other pipe line 18 connected to the front brake cylinders and to which the pressure prevailing in the other supply line 15 is transmitted with a certain time-lag.

Thus, it will be seen that when the driver depresses the brake pedal the semitrailer is braked first, the tractor being braked only subsequently. If the rear axle of the tractor is unloaded, that is, if the semitrailer is not coupled thereto, the ball 60 is free since the end of lever 65 is somewhat spaced therefrom and the pressures prevailing in pipe lines 15 and 15a are transmitted without any delay to the corresponding pipe lines 18 and 18a leading to the front and rear brake cylinders of the tractor.

The above-described braking circuit is characterised by a great safety of operation. In fact, in case of failure of pipe line 15a, the hydraulic fluid delivered from the brake distributor 14 through this line flows to the outside while the fluid fed through pipe line 15 actually causes the semitrailer brakes to be applied. In fact, due to the absence of pressure in pipe line 15a the slide valve 41 is retained in its inoperative position (shown in the drawing) by spring 44, so that the other pipe line 15 communicates with chamber 48 through ducts 46 and 47. Therefore, the pressure prevailing in pipe line 15 is transmitted to chamber 48, thus causing as in the preceding case the movement of piston 49 and the opening of valve 17.

Should a failure occur in pipe line 15, the pressure in the other supply line 15a would become effective as in the preceding case for braking the semitrailer.

Under these conditions it is clear that in all cases the semitrailer is adapted to be braked by these two circuits which are practically independent of each other.

Of course, the specific form of embodiment of the invention which is described hereinabove with reference to the accompanying drawing should not be construed as limiting the scope of the present invention since many modifications may be brought thereto without departing from the spirit and scope of the invention.

What I claim is:

1. Hydraulic safety valve for braking system of articulated vehicle, this system comprising a hydraulic braking circuit for the tractor which includes a source of fluid under pressure delivering same through a braking-force distributor into two pipe lines leading to the rear and front brake cylinders in which the respective fluid pressures are controlled by said braking-force distributor as a function of the load carried by the rear axle of the tractor and a semi-trailer braking circuit of one of the pneumatic and vacuum types and comprising an ON-OFF valve controlling the operation of said semi-trailer braking circuit, said hydraulic safety valve comprising a body in which two valve inlet passages are formed and connected respectively to said rear and front brake cylinder pipe lines, said body further comprising a chamber opening to the outside of said body, a trailer brake control piston slidably mounted in said chamber and having an end projecting from said body for controlling said ON-OFF valve for operating the semi-trailer braking circuit, a slide valve mounted in a cylindrical cavity of said body fed with compressed fluid via said inlet passages and supplying said chamber for actuating said trailer brake control piston, two throttling means mounted respectively in said inlet passages and controlled in a manner responsive to the trailer load, said inlet passages extending into said body beyond said throttling means to body outlets adapted to be connected to a pair of control pipe lines leading respectively to the front and rear brake cylinders of said tractor.

2. A hydraulic safety valve as set forth in claim 1, wherein said slide valve consists of two cylindrical sections adapted to slide in a fluid-tight manner in said cylindrical cavity of said body and of a constricted portion disposed between said two cylindrical sections, which comprises a spring disposed in the bottom of said cavity and adapted to urge said slide valve to an inoperative abutment position, the inlet passage connected to the pipe line connected to the rear brake of said tractor being also connected to that portion of said cylindrical cavity which surrounds the constricted portion of said slide valve in the inoperative position thereof, the inlet passage connected to the pipe line connected in turn to the front brake of said tractor being also connected, on the other hand, to that portion of said cylindrical cavity which is freed by said slide valve in the inoperative position on the side opposite to said spring.

3. A valve as set forth in claim 1, wherein said first and second separate throttling devices comprise each a connecting duct, a ball normally closing said connecting duct, a cavity in which said ball is disposed, a lever pivotally mounted in said cavity and adapted to engage said ball and seat same against the orifice of said connecting duct, the outlet pipe line connected to said brake cylinders opening into said cavity, and means for adjusting the position of said lever in said cavity as a function of the load carried by the rear axle of said tractor.

4. A valve as set forth in claim 3, associated with a shock absorbing mechanism of said tractor, which comprises two pivot pins extending through said valve body and respectively solid with the two levers of said separate throttling devices, two arms respectively solid with said pivot pins, externally of said valve body, a compensator bar interconnecting said arms, a spring attached to said compensator bar and to said shock absorbing mechanism of said tractor.

5. A valve as set forth in claim 4, which comprises means for adjusting the tension of said spring attached to said compensator bar and to said shock absorbing mechanism of said tractor.

References Cited

UNITED STATES PATENTS

| | | | |
|---|---|---|---|
| 2,675,099 | 4/1954 | Troy | 303—8 XR |
| 2,694,468 | 11/1954 | Price | 303—8 |
| 3,284,141 | 11/1966 | Henry-Biabaud | 303—23 XR |

FOREIGN PATENTS 874,968    8/1961    Great Britain.

MILTON BUCHLER, *Primary Examiner.*

J. J. McLAUGHLIN, *Assistant Examiner.*